Dec. 13, 1932.  J. B. HAMBLEN ET AL  1,890,985
MOTOR EFFICIENCY INDICATING DEVICE
Filed Oct. 7, 1929   2 Sheets-Sheet 1
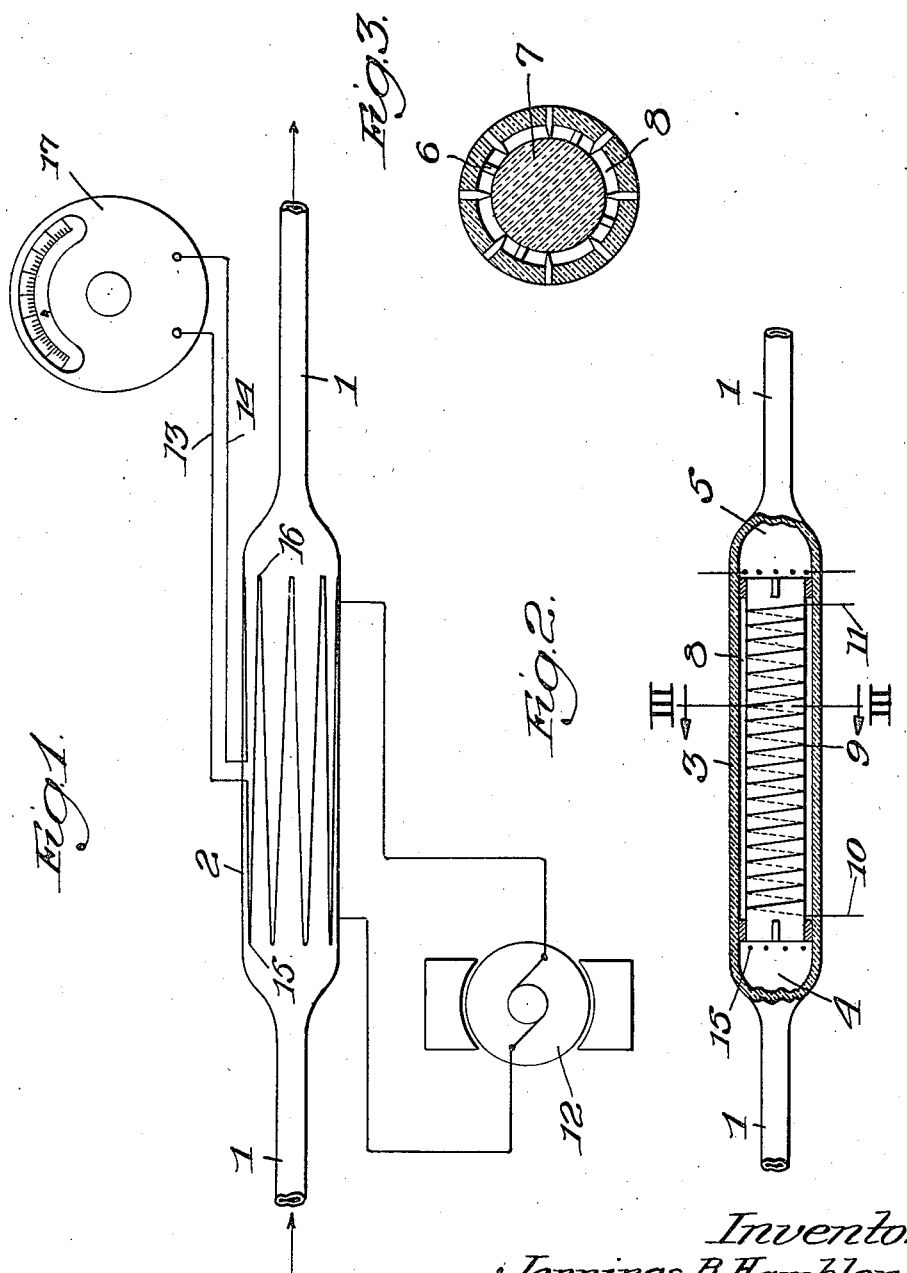
Inventors:
Jennings B. Hamblen,
and Webster B. Kay
By Dyrenforth, Lee, Chritton & Wiles
Attys.

Dec. 13, 1932.  J. B. HAMBLEN ET AL  1,890,985
MOTOR EFFICIENCY INDICATING DEVICE
Filed Oct. 7, 1929     2 Sheets-Sheet 2
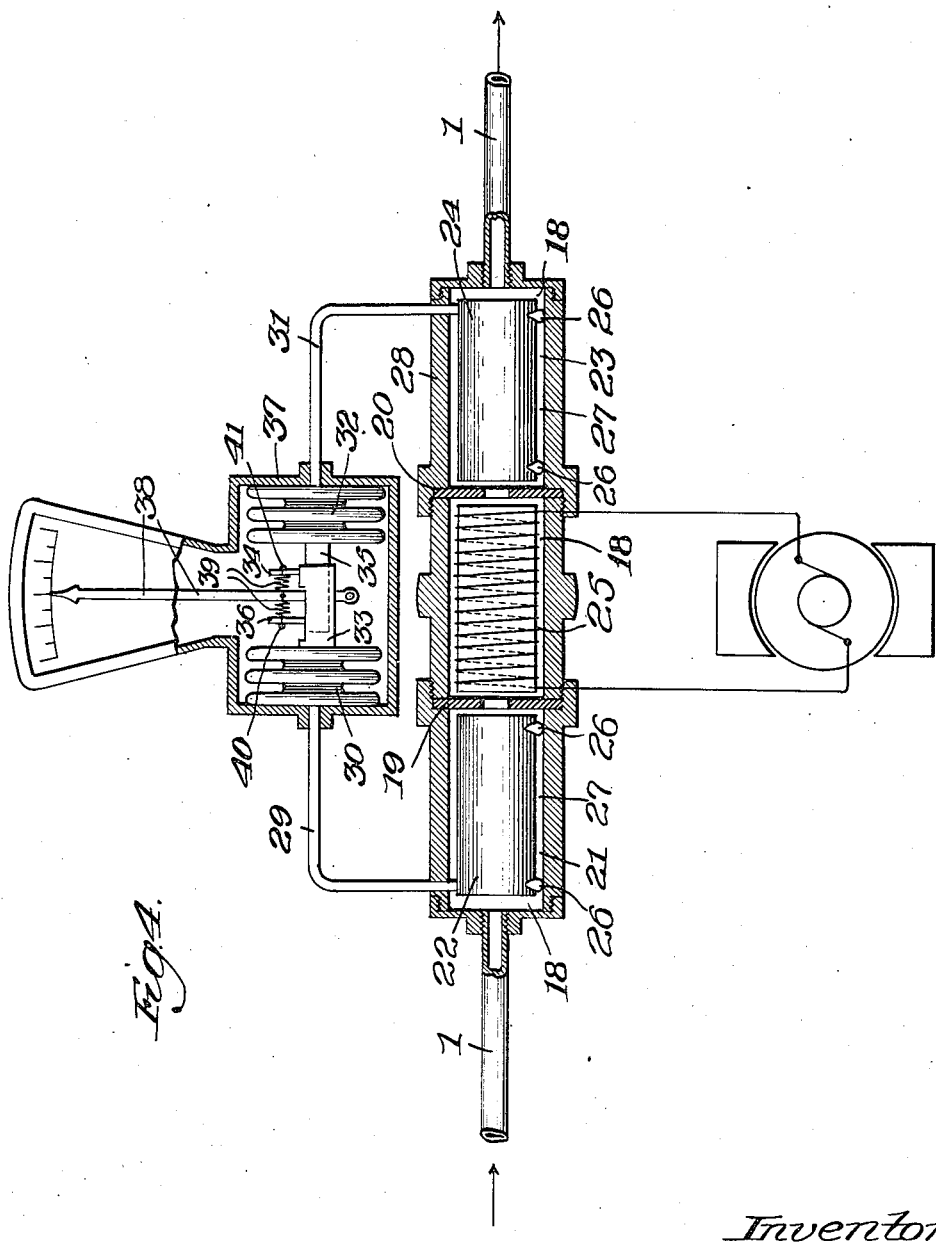

Patented Dec. 13, 1932

1,890,985

UNITED STATES PATENT OFFICE

JENNINGS B. HAMBLEN, OF WHITING, INDIANA, AND WEBSTER B. KAY, OF CHICAGO, ILLINOIS, ASSIGNORS TO JENNINGS B. HAMBLEN, HAROLD V. ATWELL AND WEBSTER B. KAY, TRUSTEES

MOTOR-EFFICIENCY-INDICATING DEVICE

Application filed October 7, 1929. Serial No. 398,016.

This invention relates to motor-efficiency-indicating apparatus, and is more particularly adapted for indicating, in motor-propelled vehicles, the distance moved per unit quantity of fluid fuel consumed.

One of the objects of the invention is to provide, in a fluid operated motor, simple and effective gage means for indicating continuously the efficiency of the motor. Another object is to provide, in a motor-propelled vehicle, means for indicating, at any particular instant, the rate of movement of the vehicle per unit of fuel consumed. Another object is to provide integrating apparatus of simple and staunch construction which may be employed in connection with a fluid-propelled vehicle for indicating the amount of fuel consumed per degree or rate of movement of a particular moving part of the vehicle. A further object is to provide means which will enable the operator of a motor vehicle to detect immediately any decrease in efficiency of the motor, and which will also guide him in making adjustments or repairs necessary to maintain the motor efficiency at highest possible point. Another object is to provide means which will enable an operator of a fluid-propelled vehicle to ascertain the speed at which the vehicle may be driven with lowest consumption of fluid. Other objects and advantages will appear as the description proceeds.

The invention is fully described in the following specification and shown in the accompanying drawings, in which—

Figure 1 is a diagrammatic view of assembled apparatus in which my invention may be practiced; Fig. 2 is a broken section view of an enlarged conduit illustrated in Fig. 1; Fig. 3 is a transverse sectional view, the section being taken as indicated at line 3 of Fig. 2; and Fig. 4 is a broken sectional view of apparatus embodying a modified form of my invention.

In the illustration given, numeral 1 represents a fuel conduit leading from a supply tank (not shown) to a motor (not shown). Numeral 2 represents an enlarged portion of the conduit, which may be interposed at any point in line 1 between the supply tank and the motor. In a gasoline automobile, it is preferred to have the enlarged conduit 2 between the gasoline pump and the carbureter. Enlarged conduit 2 is preferably provided with a heat insulating case 3 which extends from the inlet portion 4 thereof to the outlet portion 5. Within case 3, and spaced therefrom by spacers 6, is a relatively long and large core member 7, preferably cylindrical in shape, which is closed and which forms, together with spacers 6, an annular conduit 8 through which the fuel may pass. The core member 7 may be a solid body or, if desired, it may be a hollow cylindrical body having its ends closed to prevent fuel entering it.

As illustrated more clearly in Fig. 3, around core member 7 is wound an electric resistance element 9 having one terminal 10 and another terminal 11 connected to wires leading to a generator or magneto 12.

The magneto or generator 12 may be connected to any moving part of the vehicle in any suitable manner. Preferably, it is connected to an axle of a car, or to the transmission, or to some other part, the rotation of which will indicate accurately the rate of movement of the vehicle. If desired, the parts may be so constructed as to employ the moving part of the car as the armature or connections may be made between the moving part of the car and a separate magneto or generator unit. If desired, the armature of the generator may be suitably connected by a flexible shaft to the transmission of the car in the same manner as the speedometer is connected.

Instead of employing a separate generator for this purpose, the main generator of the vehicle, or any other current giving source, the power output of which is a direct function of the speed of the car, may be employed. With the construction described, the heat generated by the current passing through resistance element 9 will have a direct relation to the speed of the vehicle or to some moving part thereof.

It will be observed that fuel passing through the annular conduit 8 will be heated by electric resistance element 9. To measure the temperature rise of the fluid, any suitable temperature indicating apparatus may be employed. In the illustration given, a multiple thermo-couple having leads 13 and 14 is employed, with junctions on the inlet side of conduit 2 at 15 and near the outlet end of tube 2 at 16. A millivolt-meter 17 is employed in connection with the thermo-couple to indicate the true temperature rise of the fluid passing through conduit 8. The scale upon millivolt-meter 15 may be graduated to show the distance travelled per unit quantity of fuel consumed.

In the operation of the device, the fluid passing through conduit 1 and the annular conduit 8 is subjected to heat from the electric resistance element 9, the heat being proportional to the speed of the vehicle, or a moving part thereof. The terminals of multiple thermo-couple at 15 are at the temperature of the liquid before being subjected to heat, while the terminals at 16 are at the temperature of the fluid which has passed through conduit 8. The temperature rise is indicated by millivolt-meter 17, the scale graduations thereof being modified to indicate distance or speed per unit quantity of fuel consumed. Since the resistance of the element 9 is constant, the heat developed therein will be proportional to the voltage impressed by the generator and, hence, will bear a definite relation to the speed of the car or one of its moving parts.

Since this heat is transferred directly to the gasoline or other fluid flowing past the element 9, the temperature of the fluid will be higher at the outlet than at the inlet of chamber or conduit 2. However, it is obvious that the temperature rise of the fluid will be influenced also by the rate of flow or volume of the fluid as well as by the rate of heat influence, increasing with decreasing flow at constant rate of heat input, and also increasing with increasing heat input at constant flow. The result of these effects is to give a temperature rise in the gasoline, or other fuel flowing through conduit 8, which bears a definite relation to the rate of movement of the vehicle or one of its parts and to the unit quantity of fuel consumed.

In the modification illustrated in Fig. 4, the fluid fuel passes through line 1 into an enlarged chamber or conduit 18. The chamber 18 is divided into three parts by two intermediate baffles or discs 19 and 20, both baffles being perforated to permit the flow of liquid therethrough. The inlet chamber 21 houses a bulb 22 adapted to contain fluid and the outlet chamber 23 contains a similar bulb 24. The intermediate chamber 25 houses a core and resistance element similar to the corresponding parts described in connection with Figs. 1, 2 and 3. Spacers 26 or suitable means may be employed for maintaining bulbs 22, 24 and the core member in position to provide annular conduits 27. The conduit 18 is provided with insulated walls 28, which are preferably formed with threaded sections to permit disassembly of the three main parts thereof.

Connected to bulb 22 is a fluid conduit 29 leading to a metal bellows 30. A similar conduit 31 leads from bulb 24 to metal bellows 32. Metal bellows 30 is provided on its inner side with a tubular extension 33 to which is attached a post 34. The bellows member 32 is provided with extension 35 which is telescopically received within tube 33 and which is also provided with a vertical post member 36, the tubular extension 33 being provided with a slot which permits reciprocation of member 36. Surrounding the bellows members 30 and 32 is a casing 37 which may be of any suitable shape or construction. Pivotally secured to casing 37 is an indicator 38. Posts 34 and 36 may be connected by springs 39 to indicator 38. Adjustment screws 40 and 41 may be employed to change the tension on springs 39. The upper portion of casing 37 is provided with a scale which is graduated to indicate rate of movement of vehicle per unit quantity of fuel consumed.

In the operation of the modified form of apparatus, the bellows, bulbs and fluid conduits therebetween are filled with some suitable fluid having a high co-efficient of expansion, such as, for example, toluene. As the fuel is passed through chamber 21, the fluid in bulb 22 is subjected to the temperature influence thereof. The material in bulb 24 is subjected to the temperature influence of the fuel after it has passed through the perforated baffle 19 and the annular conduit about the electric resistance element. The expansion of the material in the bulbs and bellows thus reflects the true change in temperature of the fuel after it has passed through chamber 25 and, by means of the indicating mechanism described, the mileage per gallon, or distance per unit quantity of fuel consumed, will be designated on the graduated scale.

While we have described particular temperature-change-indicating apparatus, it will be understood that equivalent forms or modifications thereof may be used without departing from the spirit of the invention.

It will also be obvious that, while the invention has been described in connection with a moving vehicle, such as, for example, an automobile, it may be employed with vehicles such as airplanes, boats, locomotives, and the like. It is likewise apparent that it may be used with stationary engines or motors to indicate the amount of work performed per unit of fuel consumed.

While we have described the operation of our measuring device as depending on an electric current produced by a generator, it should be understood that we may operate our device by a current obtained from any other source, providing, of course, that such current vary regularly with the work done by the engine.

The foregoing detailed description has been given for clearness of understanding only, and no unnecessary limitations should be understood therefrom, but the appended claims should be construed as broadly as permissible, in view of the prior art.

What we regard as new, and desire to secure by Letters Patent, is:

1. In an efficiency indicator for motor vehicles, a fuel supply, a conduit leading from said supply to the motor, a heating element adapted to raise the temperature of fuel in said conduit, the degree of said heating being proportional to the speed of one of the moving parts of said vehicle, and means for indicating the rate of movement of vehicle per unit quantity of fuel consumed.

2. In an efficiency indicator for motor vehicles, a fuel supply, a conduit through which a stream of fuel is supplied to the motor, heating means associated with a moving part of said vehicle and adapted to heat said stream, the degree of heat bearing a pre-determined relation to the movement of said vehicle part, and means for indicating the rate of movement of vehicle per unit quantity of fuel consumed.

3. In an efficiency indicator for motor vehicles, a fuel supply, a conduit through which a stream of fuel is supplied to the motor, an electric resistance element associated with said conduit and adapted to heat said stream, means associated with a moving part of said vehicle adapted to supply a current to said resistance element, said current having a pre-determined relation to the speed of said moving part, and means for indicating the rate of movement of vehicle per unit quantity of fuel consumed.

4. In an efficiency indicator for motor vehicles, a fuel supply, a conduit through which a stream of fuel is supplied to the motor, heating means associated with a moving part of said vehicle and adapted to heat said stream, the degree of said heat having a fixed relation to movement of said vehicle part, and expansion means contacting with said stream and adapted to indicate the rate of movement of vehicle per unit quantity of fuel consumed.

5. In an efficiency indicator for motor vehicles, a fuel supply, a conduit through which a stream of fuel is supplied to the motor, heating means associated with a moving part of said vehicle, and adapted to heat said stream, the degree of said heating having a fixed relation to movement of said vehicle part, expansion means, and means for indicating the temperature change of said stream, said means comprising fluid-filled bulbs adjacent said heating means and apparatus adapted to designate upon a scale the difference in the expansion of fluid in the bulbs.

6. In an efficiency indicator for motor vehicles, a fuel supply, a conduit through which a stream of fuel is supplied to the motor, heating means associated with a moving part of said vehicle and adapted to heat said stream, the degree of said heating having a fixed relation to movement of said vehicle part, and expansion means for indicating the temperature-change of said stream comprising fluid-containing bulbs located on the opposite sides of said heating means, fluid expansion bellows communicating with said bulbs, and means associated with said bellows for indicating the difference in the expansion of said bellows.

7. The method of measuring the movement of a motor vehicle per unit quantity of fuel consumed, which comprises heating a portion of the fuel stream flowing to said motor, the degree of said heating bearing a fixed relation to the speed of a moving part of said vehicle, measuring the temperature-change of said fuel stream, and indicating said change in units of movement of the vehicle per unit quantity of fuel consumed.

8. Apparatus for indicating at every instant the efficiency of an engine at that instant, comprising a fuel supply, a conduit through which a stream flows from said supply to said engine, an electric resistance element associated with said conduit and adapted to heat said stream, means associated with a moving part driven by said engine adapted to supply current to said resistance element, said current having a fixed relation to the speed of said moving part, and visual means for indicating the temperature change of such stream.

9. In an efficiency indicator for a motor, a fuel supply, a conduit leading from said supply to the motor, means for changing the temperature of fuel in said conduit, the degree of said temperature change being proportional to the speed of a moving part driven by said motor, and means for indicating the rate of movement of the motor per unit quantity of fuel consumed.

WEBSTER B. KAY.
JENNINGS B. HAMBLEN.